Jan. 3, 1933. D. H. DAVIS 1,892,797
FIFTH WHEEL CONSTRUCTION FOR TRACTORS AND SEMITRAILERS
Filed March 18, 1931
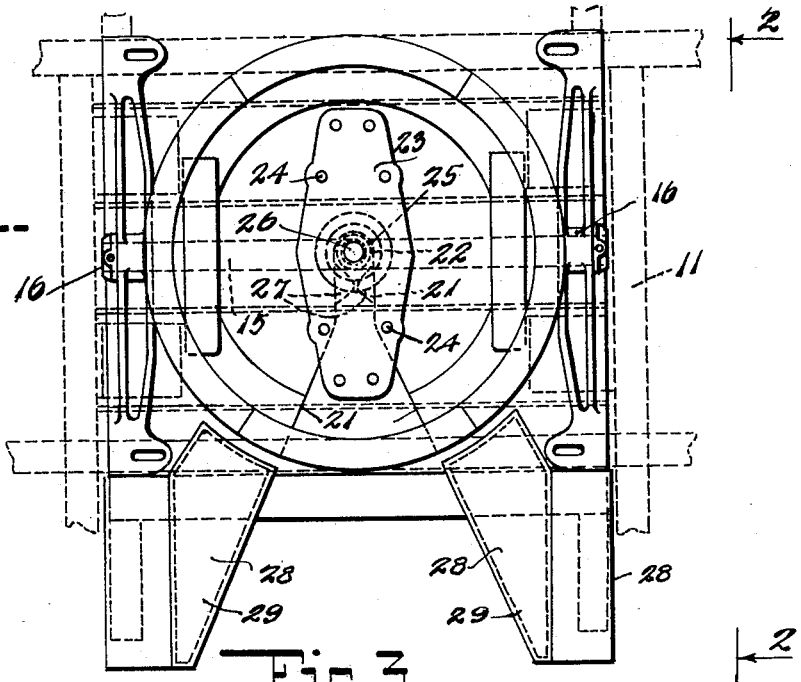
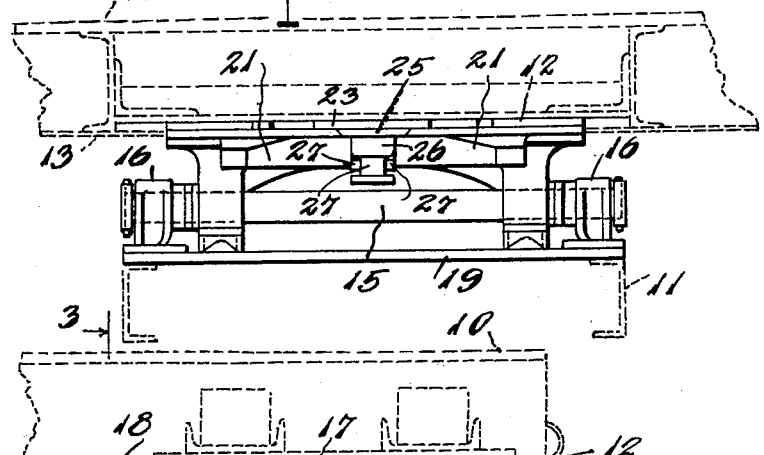
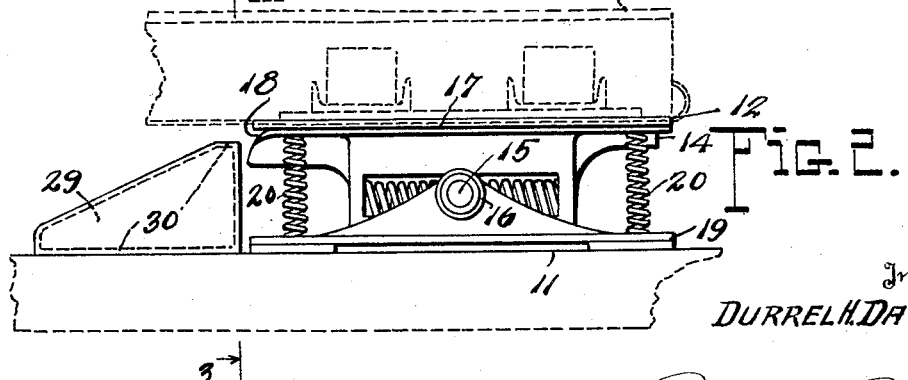
Inventor
DURREL H. DAVIS.
By *Robert Cobb*
Attorneys Patented Jan. 3, 1933

1,892,797

UNITED STATES PATENT OFFICE

DURREL H. DAVIS, OF EDGERTON, WISCONSIN, ASSIGNOR TO HIGHWAY TRAILER COMPANY, OF EDGERTON, WISCONSIN, A CORPORATION

FIFTH WHEEL CONSTRUCTION FOR TRACTORS AND SEMITRAILERS

Application filed March 18, 1931. Serial No. 523,558.

The present invention relates to combined vehicle units consisting in a tractor and a semitrailer of the type which utilizes load supporting members, commonly referred to as jacks, adapted to support the forward end of the trailer when it is detached from the tractor but also adapted to be moved to an inoperative position when the forward end of the trailer is engaged by the tractor.

The present invention has for an object the provision of a novel means for shifting the weight of the load on the forward end of the trailer on to a platform or fifth wheel provided on the rear end of the tractor to effect a coupling operation. In one type of construction now employed for accomplishing this purpose there is provided a tiltable lower fifth wheel member on the rear end of the tractor and a second tiltable fifth wheel member on the forward end of the trailer. Normally when the tractor is in a position for backing into the trailer to receive the trailer and the load thereon these two fifth wheel members are inclined complementarily. When the tractor is backed toward the trailer the two fifth wheel members come into engagement. These fifth wheel members, being pivoted upon their respective frames of the vehicle, tilt forwardly of the tractor and assume a horizontal position as they become centered upon each other. A locking means is provided for automatically securing the two members in their centered position so that a coupling operation is effected. In the present invention the lifting action of the trailer is accomplished by means of guide members positioned on the tractor frame and adapted to receive the brunt of the collision between the tractor and trailer, whereby the fifth wheel member on the trailer is engaged by these guide members and the entire weight of the forward end of the trailer and its load is guided upwardly and slid on the fifth wheel member of the tractor with a minimum amount of friction involved between the two members and with a considerable decrease in wear and tear on the pivoted pin on which the lower fifth wheel member is tilted. Means is also provided for maintaining the tiltable lower fifth wheel member in a substantially horizontal position to receive the upper fifth wheel member on the trailer after the same has been elevated by the guides.

In addition to the above outlined features of the invention it is an object of the same to provide an interconnection between the tractor and the trailer which is comprised of a minimum number of moving parts and which is consequently unlikely to get out of order. Comparative inexpensive manufacture, convenience of arrangement of parts, simplicity of design, ruggedness and consequently durability are further desirable features that have been borne in mind in the development of the present invention.

With these and other objects in view, which will become more readily apparent as the nature of the invention is better understood, the same consists in the novel construction, combination and arrangement of parts shown in the accompanying single sheet of drawing forming a part of this specification, and in which drawing Fig. 1 is a top plan view of the assembled fifth wheel connection, the tractor and trailer members being shown in dotted lines.

Fig. 2 is a side elevation taken substantially along the line 2—2 of Fig. 1.

Fig. 3 is a side elevation taken substantially along the line 3—3 of Fig. 2.

In all of the above described views like characters of reference are employed to designate like parts throughout.

A portion of the frame of the semitrailer is designated at 10 and the tractor frame is shown at 11. A swivel or fifth wheel connection is provided for these two vehicles to permit free articulation of one with respect to the other when they are coupled together. This swivel connection comprises an upper fifth wheel member 12 which is rigidly secured to the under side of the auxiliary frame 13. The auxiliary frame 13 is slidably supported by mechanism, not shown, with respect to the main frame 10 of the vehicle, as is customary in some present day constructions. This sliding connection between the auxiliary frame and the main frame 10 of the trailer forms no part of the invention but is merely adapted for use in connection with the present type of interconnection between the tractor and the trailer.

The lower fifth wheel member 14 which is mounted on the tractor frame 11 is tiltably mounted on a horizontally extending shaft 15 journalled in bearings 16 on the tractor frame 11 to permit the lower fifth wheel member to be tilted forwardly and rearwardly. Normally these lower fifth wheel members assume a definite nontilted horizontal position as shown in Figs. 2 and 3. The lower fifth wheel member 14 is in the form of a casting and is provided with a platform or table 17, the rear edge of which is curved downwardly at 18 for a purpose to be more fully described hereinafter.

Extending between the base portion 19 carrying the bearings 16 and the underneath side of the platform 17 are a plurality of compression springs 20, which springs serve to normally maintain the fifth wheel member 14 in a horizontal position to receive the upper fifth wheel member 12 thereon. The upper fifth wheel member 12 is provided with a face plate 23 secured to the underneath face portion of this fifth wheel member by suitable attaching means 24. This face plate 23 is provided with a raised boss 25 carrying a king pin 26 having a reduced portion 27 forming a groove therearound. The lower fifth wheel member 14 is formed with a rearwardly opening V-shaped slot 21 terminating adjacent the center of the fifth wheel member in the semi-annular bearing 22. This slot serves as a guide in directing the king pin 26 into the bearing for centering the fifth wheel members when the tractor is backed toward the trailer during the coupling operation. A pair of locking ears 27 are pivotally mounted on the face plate 23 and project inwardly of the V-shaped slot 21 to maintain the king pin 26 in its bearing. These locking ears are provided with suitable manual controls, not shown, for permitting uncoupling of the device when desired.

Mounted on the tractor frame 11 rearwardly of the fifth wheel member 14 is a pair of guides 28. These guides may be in the form of castings and are provided with upwardly inclined bearing surfaces 29 upon which the upper fifth wheel member 12 of the trailer is adapted to ride. The opposed sides of the guides 28 are inclined toward each other in alinement with the edges of the V-shaped slot 21 in the upper fifth wheel member 12. The extreme upper portion 30 of the guides 28 are leveled horizontally and occupy a position adjacent the curved rearward end of the platform 17 of the fifth wheel member 14.

In actual operation when the trailer is to be connected with the tractor, the two vehicles are alined and the tractor is backed into the trailer. The normally inclined upper fifth wheel member 12 of the trailer engages the guides 28 and slides upwardly thereon with the king pin depending between the inclined sides 29 of these guides. These guides act as a gathering means and direct the king pin into the V-shaped slot 21 of the lower fifth wheel member 14. When the surfaces of the guides 28, which are brought to bear upon the upper fifth wheel member 12, throw their effective bearing weight over the center of the tiltable upper fifth wheel member 12, this fifth wheel member, reaching a state of unstable equilibrium is tilted to a horizontal position whence it rests upon the spring guided fifth wheel member 14. The upper fifth wheel member 12 continues to slide horizontally upon the fifth wheel member 14 until the king pin 26 passes the locking ears 27 and enters the bearing portion of the V-shaped slot 21. The tractor and trailer are then in their coupled position. In uncoupling the devices a reversal of operation of parts occurs. The ears 27 being removed from the path of the king pin, the lower fifth wheel member slides horizontally and rearwardly from the upper fifth wheel member on to the bearing surfaces 29 of the guides 28. When the effective bearing surfaces of these guides again apply pressure past the dead center point of the tiltable upper fifth wheel member 12, this fifth wheel member assumes an inclined position and slides downwardly and rearwardly off of the guide members 28, whence the forward end of the trailer is supported from the traction surface.

Throughout this specification the movement of parts as described are purely relative and it is to be understood that rearward movement of the elements carried by the trailer mechanism implies relative rearward movement of these elements with respect to the tractor, for actually the tractor is moved away from or backed into the trailer.

The invention is not to be limited to the exact arrangement of parts shown in the accompanying sheet of drawing or described in this specification, as various changes in the details of construction may be resorted to without departing from the spirit of this invention.

Only insofar as the invention has been particularly pointed out in the accompanying claims is the same to be limited.

Having thus described my invention, what I claim as new and desire to secure by Letters Patent in the United States, is:

1. The combination with a vehicle frame having a normally horizontal fifth wheel member tiltably mounted thereon and adapted to cooperate with a mating coupling on another vehicle, of a rigid inclined guiding instrumentality mounted on the first mentioned vehicle adjacent the fifth wheel member for guiding the mating coupling onto the fifth wheel member, and spring parts coacting with the fifth wheel member for resiliently holding the said fifth wheel member yieldingly in horizontal position so that its surface is about in the plane of the upper end of the said guiding instrumentality.

2. The combination with a vehicle frame having a fifth wheel member including a platform mounted thereon and adapted to co-operate with the coupling member on an associated vehicle, of an inclined guide on the vehicle independent of the member, the guide having an inclined surface thereon extending from a plane below the platform to substantially the plane of the fifth wheel platform and adapted to guide the said coupling onto the said platform, and a plurality of coiled springs coacting between the fifth wheel member and the platform for normally holding the member in a horizontal position while allowing a resilient tilting thereof to receive a mating coupling member.

In testimony whereof I affix my signature.

DURREL H. DAVIS.